US012701626B2

(12) United States Patent
Hong

(10) Patent No.: US 12,701,626 B2
(45) Date of Patent: Aug. 4, 2026

(54) CAPABILITY INDICATION METHOD AND APPARATUS, CAPABILITY DETERMINATION METHOD AND APPARATUS, COMMUNICATION APPARATUS AND STORAGE MEDIUM

(71) Applicant: Beijing Xiaomi Mobile Software Co., Ltd., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 282 days.

(21) Appl. No.: 18/690,022

(22) PCT Filed: Sep. 7, 2021

(86) PCT No.: PCT/CN2021/117045
§ 371 (c)(1),
(2) Date: Mar. 7, 2024

(87) PCT Pub. No.: WO2023/035123
PCT Pub. Date: Mar. 16, 2023

(65) Prior Publication Data
US 2024/0389185 A1      Nov. 21, 2024

(51) Int. Cl.
H04W 8/18         (2009.01)
H04W 8/22         (2009.01)
H04W 76/25        (2018.01)
H04W 76/27        (2018.01)
H04W 88/06        (2009.01)

(52) U.S. Cl.
CPC .......... *H04W 76/25* (2018.02); *H04W 76/27* (2018.02); *H04W 88/06* (2013.01)

(58) Field of Classification Search
None
See application file for complete search history.

(56) References Cited

U.S. PATENT DOCUMENTS 9,474,105 B2 * 10/2016 Awoniyi-Oteri ...... H04W 88/06
9,491,276 B2 * 11/2016 Kanamarlapudi ... H04B 1/3816
(Continued)

FOREIGN PATENT DOCUMENTS

CN       106034320 A      10/2016
CN       110495208 A      11/2019
(Continued)

OTHER PUBLICATIONS

State Intellectual Property Office of the People's Republic of China, Office Action and Search Report Issued in Application No. 2021800028749, Jul. 23, 2025, 28 pages. (Submitted with English Translation).
(Continued)

*Primary Examiner* — Tuan A Tran
(74) *Attorney, Agent, or Firm* — Volpe Koenig

(57) ABSTRACT
The present disclosure relates to capability indication methods and apparatuses, capability determination methods and apparatuses, electronic devices and storage media, where the capability indication method includes: sending capability information to a network side device, where the capability information is used for indicating a capability of the terminal to perform multi-SIM connection switching.

18 Claims, 2 Drawing Sheets

Receive capability information sent by a terminal ～ S301

Determine a capability of the terminal to perform multi-SIM connection switching according to the capability information ～ S302

Send configuration signaling to the terminal, where the configuration signaling is used for indicating a configuration for the terminal to report information about the multi-SIM connection switching to the network side device ～ S401

(56) References Cited

U.S. PATENT DOCUMENTS

| | | | | |
|---|---|---|---|---|
| 10,492,132 | B2 * | 11/2019 | Lindoff | H04W 48/18 |
| 10,911,995 | B2 * | 2/2021 | Tsai | H04W 8/18 |
| 11,445,414 | B2 * | 9/2022 | Ukil | H04W 36/0061 |
| 11,606,684 | B2 * | 3/2023 | Cui | H04W 68/005 |
| 11,706,840 | B2 * | 7/2023 | Kavuri | H04W 8/24 |
| | | | | 370/329 |
| 11,997,749 | B2 * | 5/2024 | Tsuda | H04W 8/04 |
| 12,133,190 | B2 * | 10/2024 | Ianev | H04W 8/20 |
| 12,232,070 | B2 * | 2/2025 | Singh | H04W 8/20 |
| 12,294,881 | B2 * | 5/2025 | Yang | H04W 72/21 |
| 12,309,873 | B2 * | 5/2025 | Bergström | H04W 76/30 |
| 12,382,534 | B2 * | 8/2025 | Chen | H04W 74/002 |
| 2003/0153356 | A1 | 8/2003 | Liu | |
| 2018/0124692 | A1 | 5/2018 | Tan | |

FOREIGN PATENT DOCUMENTS

| | | |
|---|---|---|
| CN | 112469025 A | 3/2021 |
| WO | 2021147958 A1 | 7/2021 |

OTHER PUBLICATIONS

Apple Inc, "Signaling aspects of MUSIM Network Switching", R2-2103831, 3GPP TSG-RAN WG2 Meeting # 113 bis Electronic, Online, Apr. 12-Apr. 20, 2021, 7 pages.

OPPO, "Interaction between AS-based and NAS-based Solution for Network Switching", R2-2107027, 3GPP TSG-RAN WG2 Meeting #115 electronic, Online, Aug. 2021, 2 pages.

ETSI MCC, Report of 3GPP TSG RAN W62 meeting #113bis-e, Online, R2-2104701, 3GPP TSG-RAN W62 meeting #114-e, Agenda Item , May 11, 2021, 277 pages.

ISA State Intellectual Property Office of the People's Republic of China, Written Opinion of the International Searching Authority Issued in Application No. PCT/CN2021/117045, Mar. 24, 2022, WIPO, 6 pages.

ISA State Intellectual Property Office of the People's Republic of China, International Search Report Issued in Application No. PCT/CN2021/117045, Mar. 24, 2022, WIPO, 4 pages.

* cited by examiner

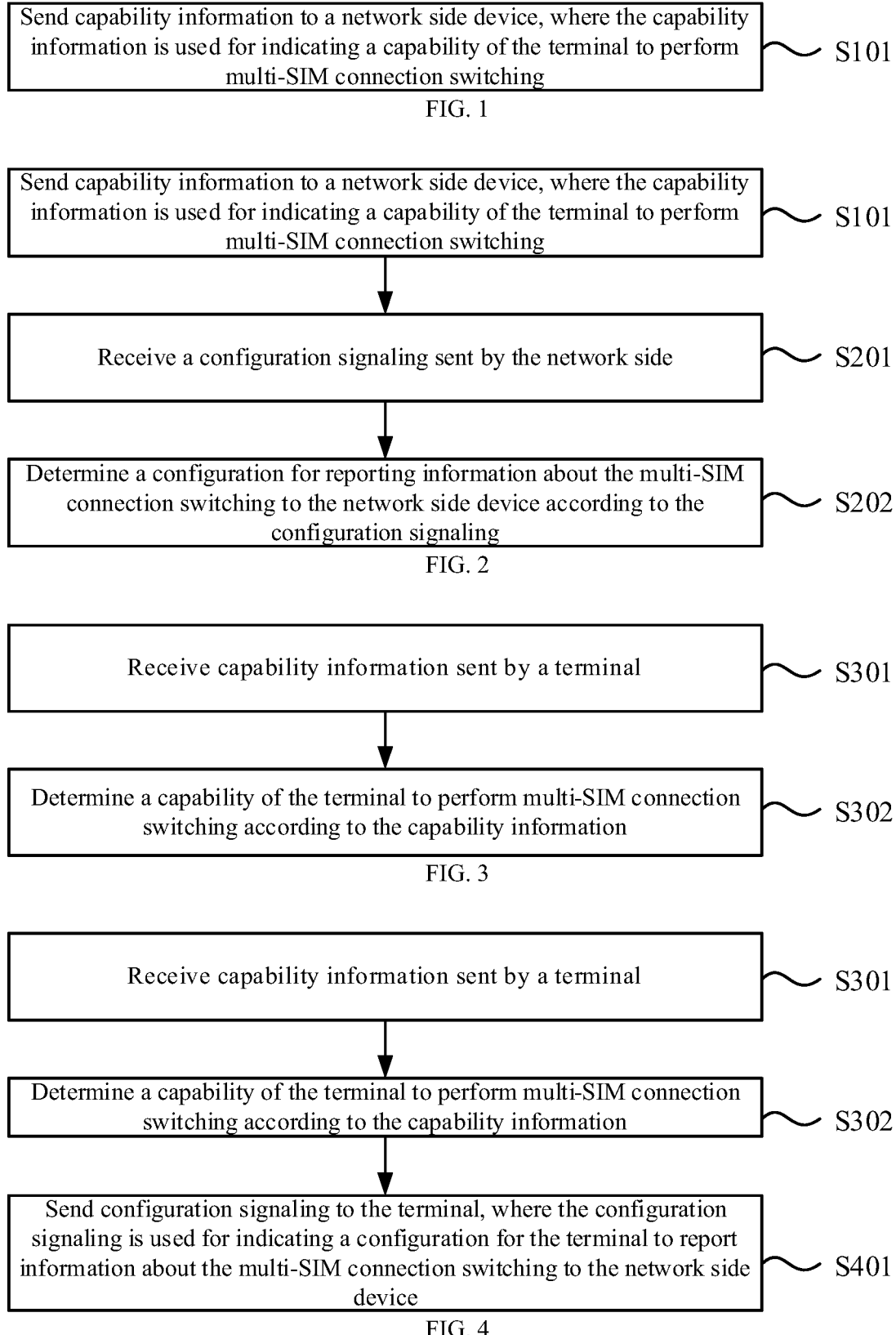

Send capability information to a network side device, where the capability information is used for indicating a capability of the terminal to perform multi-SIM connection switching   ∽ S101

FIG. 1

Send capability information to a network side device, where the capability information is used for indicating a capability of the terminal to perform multi-SIM connection switching   ∽ S101

Receive a configuration signaling sent by the network side   ∽ S201

Determine a configuration for reporting information about the multi-SIM connection switching to the network side device according to the configuration signaling   ∽ S202

FIG. 2

Receive capability information sent by a terminal   ∽ S301

Determine a capability of the terminal to perform multi-SIM connection switching according to the capability information   ∽ S302

FIG. 3

Receive capability information sent by a terminal   ∽ S301

Determine a capability of the terminal to perform multi-SIM connection switching according to the capability information   ∽ S302

Send configuration signaling to the terminal, where the configuration signaling is used for indicating a configuration for the terminal to report information about the multi-SIM connection switching to the network side device   ∽ S401

CAPABILITY INDICATION METHOD AND APPARATUS, CAPABILITY DETERMINATION METHOD AND APPARATUS, COMMUNICATION APPARATUS AND STORAGE MEDIUM

CROSS-REFERENCE TO RELATED APPLICATION

The present application is a U.S. National Stage of International Application No. PCT/CN2021/117045, filed on Sep. 7, 2021, the contents of which are incorporated herein by reference in their entirety.

TECHNICAL FIELD

The present disclosure relates to the field of communication technologies, and in particular, to capability indication methods, capability determination methods, capability indication apparatuses, capability determination apparatuses, communication apparatuses, and computer-readable storage media.

BACKGROUND

In a multiple subscriber identity module (multi-SIM) terminal, a plurality of subscriber identity modules (SIMs) can be set up, and the terminal can communicate via the plurality of SIMs. For example, SIM #1 and SIM #2 are set up in the terminal, and the terminal can use SIM #1 to perform communication operations or SIM #2 to perform communication operations.

However, in some scenarios, there may be a situation where the terminal needs to use SIM #2 for communication when it is using SIM #1 for communication, which requires the terminal to perform multi-SIM connection switching, e.g., switching from using SIM #1 for communication to using SIM #2 for communication. However, the capabilities of different terminals are different, and if all terminals are set to support multi-SIM connection switching by default, it may lead to problems when a base station makes configuration for those terminals that do not support multi-SIM connection switching.

SUMMARY

In view of this, embodiments of the present disclosure propose capability indication methods, capability determination methods, capability indication apparatuses, capability determination apparatuses, communication apparatuses, and computer-readable storage media to solve technical problems in related technologies.

According to a first aspect of an embodiment of the present disclosure, a capability indication method is provided, which is performed by a terminal, and the method includes: sending capability information to a network side device, where the capability information is used for indicating a capability of the terminal to perform multi-SIM connection switching.

According to a second aspect of an embodiment of the present disclosure, a capability determination method is provided, which is performed by a network side device, and the method includes: receiving capability information sent by a terminal; and determining a capability of the terminal to perform multi-SIM connection switching according to the capability information.

According to a third aspect of an embodiment of the present disclosure, a communication apparatus is provided, including: a processor; a memory for storing a computer program; when the computer program is executed by the processor, it implements operations including: sending capability information to a network side device, where the capability information is used for indicating a capability of a terminal to perform multi-SIM connection switching.

BRIEF DESCRIPTION OF DRAWINGS

In order to more clearly illustrate technical solutions in the embodiments of the present disclosure, a brief introduction will be given below to the accompanying drawings required in the description of the embodiments. It is evident that the accompanying drawings in the following description are only some embodiments of the present disclosure. For those of ordinary skill in the art, other accompanying drawings can be obtained based on these accompanying drawings without paying creative labor.

FIG. 1 is a schematic flowchart of a capability indication method illustrated according to an embodiment of the present disclosure.

FIG. 2 is a schematic flowchart of another capability indication method illustrated according to an embodiment of the present disclosure.

FIG. 3 is a schematic flowchart of a capability determination method illustrated according to an embodiment of the present disclosure.

FIG. 4 is a schematic flowchart of another capability determination method illustrated according to an embodiment of the present disclosure.

DETAILED DESCRIPTION

Figures 5, 6:
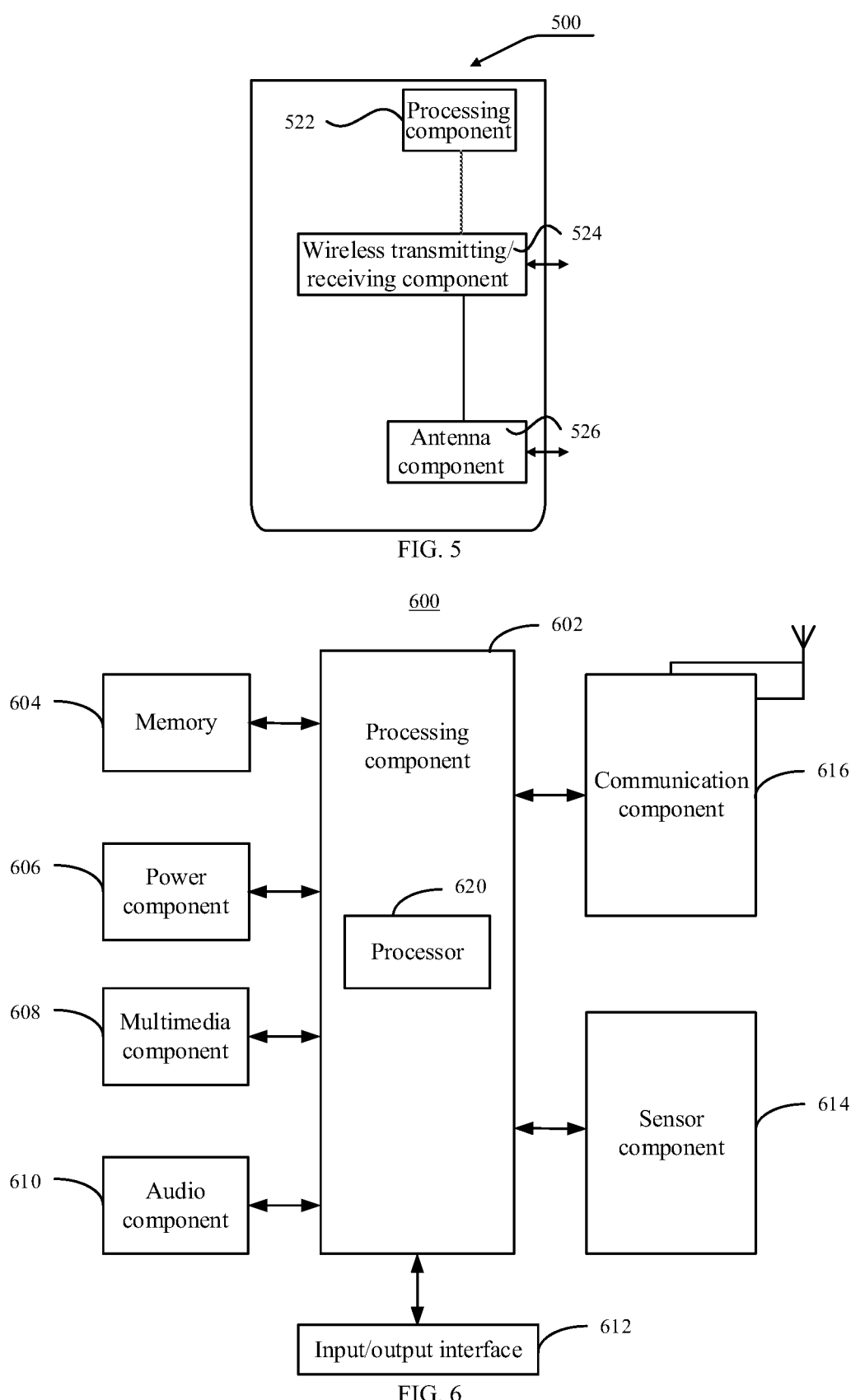
FIG. 5 is a schematic block diagram of an apparatus for capability indication illustrated according to an embodiment of the present disclosure.
FIG. 6 is a schematic block diagram of an apparatus for capability determination illustrated according to an embodiment of the present disclosure.

The technical solutions in the embodiments of the present disclosure will be clearly and completely described below in conjunction with the accompanying drawings in the embodiments of the present disclosure. Obviously, the described embodiments are only a part of the embodiments of the present disclosure, not the whole of the embodiments. Based on the embodiments in the present disclosure, all other embodiments obtained by those of ordinary skill in the art without making creative efforts belong to the protection scope of the present disclosure.

Terms used in embodiments of the present disclosure are only for the purpose of describing specific embodiments, and are not limiting the embodiments of the present disclosure. Singular forms of "a", said ", and "the" used in the embodiments of the present disclosure and in the claims are also intended to include majority forms, unless the context clearly indicates otherwise. It should also be understood that the term "and/or" as used herein refers to any or all of the possible combinations containing one or more of the listed items in association.

It should be understood that although terms first, second, third, etc. may be used to describe various information in the embodiments of the present disclosure, this information should not be limited to these terms. These terms are used only to distinguish the same type of information from one another. For example, without departing from the scope of the present disclosure, the first SIM can also be called the second SIM, and similarly, the second SIM can also be called the first SIM. Depending on the context, the word "if" as used herein can be interpreted as "at" or "when" or "in response to determining".

For the purpose of simplicity and ease of understanding, the terms used in the present disclosure to represent size relationships are "greater than" or "less than", "higher than" or "lower than". But for those skilled in the art, it can be understood that the term "greater than" also covers the meaning of "greater than or equal to" and "less than" also covers the meaning of "less than or equal to". The term "higher than" covers the meaning of "higher than or equal to", and "lower than" also covers the meaning of "lower than or equal to".

FIG. 1 is a schematic flowchart of a capability indication method illustrated according to an embodiment of the present disclosure. The capability indication method shown in this embodiment can be performed by a terminal, including but not limited to a communication apparatus such as a cell phone, a tablet computer, a wearable device, a sensor, an IoT device, and the like. The terminal can be used as user equipment to communicate with a network side device, including but not limited to a network side device in a communication system such as 4G, 5G, 6G, etc., and the network side device may be a base station, a core network, and the like.

In an embodiment, the terminal may be provided with a plurality of SIMs, either a conventional SIM or an eSIM, i.e., an embedded SIM.

Hereinafter, the technical solution of the present disclosure will be exemplified mainly in the case that the plurality of SIMs include a first SIM and a second SIM. The first SIM and the second SIM do not specifically refer to a certain SIM, but are used to represent any two different SIMs among a plurality of SIMs. The first SIM and the second SIM can belong to the same operator or different operators, and can be selected as required.

As shown in FIG. 1, the capability indication method may include the following step.

At step S101, capability information is sent to a network side device, where the capability information is used for indicating a capability of the terminal to perform multi-SIM connection switching.

In an embodiment, in the case that the terminal is provided with a plurality of SIMs and the plurality of SIMs at least include a first SIM and a second SIM, the multi-SIM connection switching includes switching to the second SIM for communication operation when the communication operation is performed through the first SIM (in this case, the communication operation performed by the first SIM can be interrupted). It should be noted that the multi-SIM connection switching is not limited to the above situation; for example, it may further include enabling the second SIM to perform the communication operation at the same time when the communication operation is performed through the first SIM (in this case, the communication operation performed by the first SIM can be uninterrupted). In the following, the technical solution of the present disclosure will be exemplified mainly for the case that the multi-SIM connection switching includes switching to the second SIM for the communication operation when the communication operation is performed through the first SIM.

In an embodiment, when the terminal uses the first SIM for communication, it may be necessary to switch to the second SIM for communication.

For example, after the terminal establishes a communication connection with a first base station using the first SIM, the terminal may need to use the second SIM for communication operation during communication with the first base station through the communication connection, where communication using the second SIM includes but is not limited to receiving a paging message sent by a second base station, receiving a system message sent by the second base station, and sending information to the second base station using the second SIM, etc.

In this case, if the terminal supports switching to the second SIM for communication operation when communication operation is performed through the first SIM, it can be determined that the terminal supports multi-SIM connection switching. In order to avoid redundancy in description, the terminal switching to the second SIM for the communication operation when the communication operation is performed through the first SIM will be called multi-SIM connection switching.

However, in a case that the terminal determines that the terminal supports multi-SIM connection switching, a specific support capability for multi-SIM connection switching may vary from terminal to terminal, e.g., different terminals may have different specific support conditions for multi-SIM connection switching.

In an embodiment, the capability of the terminal to perform multi-SIM connection switching includes whether the terminal is capable of performing the multi-SIM connection switching in case that a first condition is satisfied, where the first condition includes at least one of the first SIM leaves a connected state or the first SIM remains in the connected state.

For example, the terminal(s) only supports multi-SIM connection switching when the first SIM is not in the connected state, e.g., when the first SIM is used for communication operation, and if it is necessary to switch to the second SIM for communication operation, the first SIM needs to leave the connected state, and the terminal switches to the second SIM for the communication operation.

For example, terminal(s) only supports multi-SIM connection switching when the first SIM stays in the connected state, e.g., when the first SIM is used for communication operation, and if it is necessary to switch to the second SIM for communication operation, the first SIM can still be in the connected state, and the terminal may be switched to the second SIM for the communication operation.

It can be seen that the specific support situation for multi-SIM connection switching varies from terminal to terminal, and the capability of multi-SIM connection switching varies.

According to the embodiments of the present disclosure, the terminal can report the capability of multi-SIM connection switching to the network side device, such as a base station, a core network, etc., as the capability information, so that the network side device can determine a specific support situation of the terminal for the multi-SIM connection switching according to the capability information, and then make appropriate configuration for the terminal, which is beneficial to efficient utilization of communication resources.

For example, if the network side device determines, according to the capability information reported by the terminal, that the terminal supports switching to the second SIM for communication operation when the first SIM leaves the connected state and does not support switching to the second SIM for communication operation when the first SIM remains in the connected state, a configuration of the first SIM for communication operation can be determined according to a configuration of the second SIM for communication operation.

For example, it can be determined that time domain resources occupied by the second SIM for communication operation are t1 to t2. When configuring time domain resources for communication operation performed by the first SIM, time domain resources other than t1 to t2 can be configured, so as to prevent the terminal performing communication during switching from the first SIM to the second SIM at a period between t1 and t2, resulting in a waste of resources configured for the first SIM during this period.

For example, if the network side device determines, according to the capability information reported by the terminal, that the terminal supports switching to the second SIM for communication operation when the first SIM remains in the connected state, a context of the first SIM for communication operation can still be retained when it is determined that the terminal uses the second SIM for communication operation, so as to quickly resume communication with the first SIM. It should be understood that the context of the first SIM for communication operation can also be deleted to reduce the occupation of a storage space of the network side device.

In an embodiment, the first SIM leaving the connected state includes the first SIM leaving the connected state based on an access stratum (AS); and/or the first SIM leaving the connected state based on the non-access stratum (NAS).

The first SIM leaving the connected state can be according to an instruction of access stratum signaling (such as leaving the connected state according to signaling sent by a base station), or it can be leaving the connected state according to signaling sent by the non-access stratum (such as leaving the connected state according to signaling sent by a core network).

In an embodiment, the first SIM remaining in the connected state includes the first SIM remaining in the connected state based on an access stratum; and/or the first SIM remaining in the connected state based on the non-access stratum.

The first SIM remaining in the connected state can be according to an instruction of access stratum signaling (such as remaining in the connected state according to signaling sent by the base station), or it can be remaining in the connected state according to signaling sent by the non-access stratum (such as remaining in the connected state according to signaling sent by a core network).

In an embodiment, the network side device only includes a new radio (NR) network side device, and the capability information is carried in user equipment NR capability signaling; and/or the network side device includes an evolved UMTS terrestrial radio access network (E-UTRAN) network side device, and the capability information is carried in user equipment E-UTRAN capability signaling.

In an embodiment, the network side device can be a base station or a core network. Take an NR base station as an example, the terminal can carry the capability information in user equipment NR capability (UE-NR-Capability) signaling and send it to the base station. Take an E-UTRAN base station as an example, the terminal can carry the capability information in the user equipment E-UTRAN capability (UE-EUTRA-Capability) signaling and send it to the base station.

In an embodiment, the network side device includes the E-UTRAN network side device, and when the first SIM and/or the second SIM of the multi-SIM connection switching performs a communication operation based on NR, the capability information is carried in a newly added information element of the UE-EUTRA-Capability signaling.

In a case where the network side device includes the E-UTRAN network side device, if in the multi-SIM connection switching indicated by the capability information, the communication operation performed by the first SIM or the second SIM may involve the communication operation based on the NR. Since the UE-EUTRA-Capability signaling is generally suitable for indicating relevant capabilities based on EUTRA communication, but not for indicating relevant capabilities based on NR communication, the UE-EUTRA-Capability signaling can be expanded, for example, a new information element can be added to the UE-EUTRA-Capability signaling to carry the capability information.

For example, the new information element may be IRAT-ParametersNR-r17 signaling, which may include the following contents:

```
IRAT-ParametersNR-r17 ::=      SEQUENCE {
    switchWithRRCConnected-r17        ENUMERATED {supported}
    OPTIONAL,
    switchWithoutRRCConnected-r17 ENUMERATED {supported}
OPTIONAL
    }
```

FIG. 2 is a schematic flowchart of another capability indication method illustrated according to an embodiment of the present disclosure. As shown in FIG. 2, the method further includes the following steps.

At step S201, configuration signaling sent by the network side is received.

At step S202, a configuration for reporting information about the multi-SIM connection switching to the network side device is determined according to the configuration signaling.

In an embodiment, after the terminal reports the capability information to the network side device, the terminal can further report the information about multi-SIM connection switching to the network side device when performing the multi-SIM connection switching. In this case, the network side device can send the configuration signaling to the terminal after receiving the capability information, such as radio resource control (RRC) reconfiguration signaling, and the configuration signaling carries a corresponding configuration, which can include time domain resources and/or frequency domain resources. The terminal can report the information about multi-SIM connection switching based on the configuration.

In an embodiment, a configuration indication may be carried in the configuration signaling to indicate sub-signaling used for carrying the configuration in the configuration signaling. Taking RRC reconfiguration signaling as an example of the configuration signaling, the configuration can be carried in an OtherConfig signaling of RRC reconfiguration signaling, and the terminal can be informed through the configuration indication to acquire the configuration in the OtherConfig signaling of RRC reconfiguration signaling.

In an embodiment, the terminal reports the information about the multi-SIM connection switching, which may be reported when the terminal is about to perform the multi-SIM connection switching or during the process of performing the multi-SIM connection switching.

In an embodiment, the configuration includes at least one of: whether to allow the terminal to report the information about the multi-SIM connection switching; whether to allow the terminal to report information about multi-SIM connection switching satisfying a second condition; a duration of a blocking timer for the terminal to report the information about the multi-SIM connection switching, for example, a duration of the blocking timer for the terminal to report the information about the multi-SIM connection switching when the multi-SIM connection switching satisfies the second condition, e.g., the configuration may include a length of the blocking timer for the terminal to report a connection switching message leaving the RRC connected state and/or a length of the blocking timer for the terminal to report a connection switching message remaining in the RRC connected state; a third condition for the terminal to use the blocking timer, for example, the configuration may include a condition of the blocking timer for the terminal to report a connection switching message leaving the RRC connected state, and/or a condition of the blocking timer for the terminal to report a connection switching message remaining in the RRC connected state; or a support capability of the network side device for the terminal to perform the multi-SIM connection switching.

In an embodiment, the network side device can make various configurations as needed for the terminal to report information about multi-SIM connection switching, and the configuration can instruct the terminal how to report the information about multi-SIM connection switching.

In an embodiment, the method further includes: reporting, according to the configuration, the information about the multi-SIM connection switching to the network side device when performing the multi-SIM connection switching. When the terminal performs multi-SIM connection switching, it can report the information about the multi-SIM connection switching to the network side device according to the configuration of the network side device.

For example, the network side device can configure whether to allow the terminal to report the information about the multi-SIM connection switching. When the terminal determines that it is allowed to report the information about the multi-SIM connection switching according to the configuration, the terminal can report the information about the multi-SIM connection switching. In this case, the configuration can further indicate time domain resources and frequency domain resources for the terminal to report. The terminal does not report the information about the multi-SIM connection switching when the terminal determines that it is not allowed to report the information about the multi-SIM connection switching according to the configuration.

For example, the network side device can configure whether to allow the terminal to report information about multi-SIM connection switching that satisfies a second condition, e.g., the network side device can further limit the information about multi-SIM connection switching satisfying the second condition when the network side device configures allowing the terminal to report information about the multi-SIM connection switching. For example, the network side device can carry the second condition and an indicator bit in the configuration, where the indicator bit is 1, indicating that the information about multi-SIM connection switching satisfying the second condition is allowed to be reported, and the indicator bit is 0, indicating that the information about multi-SIM connection switching satisfying the second condition is not allowed to be reported.

When the terminal determines that it is allowed to report the information about multi-SIM connection switching that satisfies the second condition according to the configuration, the terminal can report the information about multi-SIM connection switching to the network side device when performing the multi-SIM connection switching satisfying the second condition. When the terminal determines that it is not allowed to report the information about multi-SIM connection switching that satisfies the second condition according to the configuration, the terminal does not report the information about multi-SIM connection switching to the network side device when performing the multi-SIM connection switching satisfying the second condition, but the terminal can report the information about multi-SIM connection switching to the network side device when performing multi-SIM connection switching satisfying other conditions.

For example, the network side device can configure a duration of a blocking timer for the terminal to report the information about the multi-SIM connection switching, further configure a duration of the blocking timer for the terminal to report the information about the multi-SIM connection switching when the multi-SIM connection switching satisfies the second condition, and may set respective durations of the blocking timers for multi-SIM connection switching that satisfies different conditions, so as to block the reporting. After the terminal determines the duration(s) of the blocking timer(s) according to the configuration, the terminal can start a blocking timer when reporting the information about the multi-SIM connection switching to the network side device, and will not report the information about the multi-SIM connection switching again within a duration of the blocking timer, that is, under the condition that the timer has not timed out.

On this basis, the network side device can further configure a third condition for the terminal to use the blocking timer, and the terminal will use the blocking timer only when it is determined that the third condition is met, and will not use the blocking timer if the third condition is not met. For example, the third condition includes a first target type of communication operation performed by the first SIM and a second target type of communication operation performed by the second SIM, etc. Then, when the terminal performs multi-SIM connection switching, if a type of communication operation performed by the first SIM is the first target type and/or a type of communication operation performed by the second SIM is the second target type, the blocking timer can be used; otherwise, the blocking timer is not used.

It should be noted that the second condition and the third condition can be set as required, which can be the same as the first condition or different from the first condition. For example, the second condition includes at least one of the following: the first SIM leaves a connected state, or the first SIM remains in the connected state. For example, the third condition includes at least one of the following: the terminal is performing or will perform multi-SIM connection switching.

In addition, due to the different performance of network side devices, different network side devices may have different support capabilities for the terminal to perform the multi-SIM connection switching. For example, some network-side devices support the terminal to perform the multi-SIM connection switching when the first SIM leaves the connected state, and some network-side devices support the terminal to perform the multi-SIM connection switching when the first SIM remains in the connected state. Therefore, the network side device may carry a support capability in the configuration and send it to the terminal, so that the terminal can decide whether or not to report the multi-SIM connection switching information according to the configuration.

For example, if it is determined that the network side device only supports the terminal to perform the multi-SIM connection switching when the first SIM remains in the connected state, the terminal does not need to report the information about multi-SIM connection switching when the first SIM leaves the connected state, so as to avoid wasting communication resources (because even if the information about multi-SIM connection switching is reported in such a case, the network side device cannot make a reasonable configuration for a process of the terminal performing multi-SIM connection switching), and the terminal can report the information about multi-SIM connection switching when the first SIM remains in the connected state for multi-SIM connection switching.

In an embodiment, the information about the multi-SIM connection switching reported by the terminal includes at least one of the following: information about the second SIM to be switched during a process of the terminal performing multi-SIM connection switching, such as an identification of the second SIM; or information about the communication operation performed after switching to the second SIM, such as a type of the communication operation performed after switching to the second SIM, a duration of the communication operation, etc.

In an embodiment, after receiving the information about multi-SIM connection switching, the network side device can make appropriate configurations for the process of multi-SIM connection switching performed by the terminal. For example, the information about multi-SIM connection switching includes a second type of communication operation to be performed when switching to the second SIM. Since a first type of communication operation being performed by the first SIM is known to the network side device, the network side device, after determining the second type, can make an appropriate configuration for the process of the terminal performing the multi-SIM connection switching based on the first type and the second type.

For example, if a priority of the first type is higher than a priority of the second type, the network side device can configure the terminal not to switch to the second SIM for communication, and if the priority of the second type is higher than the first type, the network side device can configure the terminal to switch to the second SIM for communication.

The first type and the second type can refer to service types, and the priorities corresponding to the service types can be related to delays allowed by the service types, e.g., the lower the delay allowed, the higher the priority.

In addition to the way of configuring the process of the terminal performing the multi-SIM connection switching mentioned above, other ways can also be considered. For example, delays allowed by the first type and the second type can be considered. For example, if a delay allowed by the first type is relatively large, such as greater than a delay threshold, the network side device can be configured to allow the terminal to switch to the second SIM for communication. For example, if the delay allowed by the first type is relatively small, such as less than the delay threshold, the network side device can be configured not to allow the terminal to switch to the second SIM.

FIG. 3 is a schematic flowchart of a capability determination method illustrated according to an embodiment of the present disclosure. The capability determination method shown in this embodiment can be performed by a network side device, such as a base station and a core network, the network side device may be in communication with a terminal, the terminal including but not limited to a communication apparatus such as a cell phone, a tablet computer, a wearable device, a sensor, an IoT device, etc., and the network side device includes but is not limited to a network side device in a communication system such as 4G, 5G, 6G, etc.

In an embodiment, the terminal may be provided with a plurality of SIMs, either a conventional SIM or an eSIM, i.e., an embedded SIM.

Hereinafter, the technical solution of the present disclosure will be exemplified mainly in a case where the plurality of SIMs includes a first SIM and a second SIM. The first SIM and the second SIM do not specifically refer to a certain SIM, but are used to represent any two different SIMs among a plurality of SIMs. The first SIM and the second SIM can belong to the same operator or different operators, and can be selected as required.

As shown in FIG. 3, the capability determination method may include the following steps.

At step 301, capability information sent by a terminal is received.

At step 302, a capability of the terminal to perform multi-SIM connection switching is determined according to the capability information.

In an embodiment, in a case where the terminal is provided with a plurality of SIMs, and the plurality of SIMs at least include a first SIM and a second SIM, the multi-SIM connection switching includes switching to the second SIM for communication operation when the communication operation is performed through the first SIM (in this case, the communication operation performed by the first SIM can be interrupted). It should be noted that the multi-SIM connection switching is not limited to the above situation; for example, it may further include enabling the second SIM to perform the communication operation at the same time when the communication operation is performed through the first SIM (in this case, the communication operation performed by the first SIM can be uninterrupted). In the following, the technical solution of the present disclosure will be exemplified mainly for the case that the multi-SIM connection switching includes switching to the second SIM for the communication operation when the communication operation is performed through the first SIM.

In an embodiment, when the terminal uses the first SIM for communication, it may be necessary to switch to the second SIM for communication.

For example, after the terminal establishes a communication connection with a first base station using the first SIM, the terminal may need to use the second SIM for communication operation during communication with the first base station through the communication connection, where communication using the second SIM includes but is not limited to receiving a paging message sent by a second base station, receiving a system message sent by the second base station, and sending information to the second base station using the second SIM.

In this case, if the terminal supports switching to the second SIM for communication operation when communication operation is performed through the first SIM, it can be determined that the terminal supports multi-SIM connection switching. In order to avoid redundancy in description, the terminal switching to the second SIM for the communication operation when the communication operation is performed through the first SIM will be called multi-SIM connection switching.

However, in a case where the terminal determines that the terminal supports multi-SIM connection switching, a specific support capability for multi-SIM connection switching may vary from terminal to terminal, e.g., different terminals may have different specific support conditions for multi-SIM connection switching.

In an embodiment, determining the capability of the terminal to perform multi-SIM connection switching according to the capability information includes: determining, according to the capability information, whether the terminal is capable of performing the multi-SIM connection switching in case that a first condition is satisfied, where the first condition includes at least one of the first SIM leaves a connected state or the first SIM remains in the connected state.

For example, terminal(s) only supports multi-SIM connection switching when the first SIM is not in the connected state, e.g., when the first SIM is used for communication operation, and if it is necessary to switch to the second SIM for communication operation, the first SIM needs to leave the connected state, and the terminal switches to the second SIM for the communication operation.

For example, terminal(s) only supports multi-SIM connection switching when the first SIM stays in the connected state, e.g., when the first SIM is used for communication operation, and if it is necessary to switch to the second SIM for communication operation, the first SIM can still be in the connected state, and the terminal may be switched to the second SIM for the communication operation.

It can be seen that the specific support situation for multi-SIM connection switching varies from terminal to terminal, and the capability of multi-SIM connection switching varies.

According to the embodiments of the present disclosure, the terminal can report the capability of multi-SIM connection switching to the network side device, such as a base station, a core network, etc., as the capability information, so that the network side device can determine a specific support situation of the terminal for the multi-SIM connection switching according to the capability information, and then make appropriate configuration for the terminal, which is beneficial to efficient utilization of communication resources.

For example, if the network side device determines, according to the capability information reported by the terminal, that the terminal supports switching to the second SIM for communication operation when the first SIM leaves the connected state and does not support switching to the second SIM for communication operation when the first SIM remains in the connected state, a configuration of the first SIM for communication operation can be determined according to a configuration of the second SIM for communication operation.

For example, it can be determined that time domain resources occupied by the second SIM for communication operation are t1 to t2. When configuring time domain resources for communication operation performed by the first SIM, time domain resources other than t1 to t2 can be configured, so as to prevent the terminal performing communication during switching from the first SIM to the second SIM at a period between t1 and t2, resulting in a waste of resources configured for the first SIM during this period.

For example, if the network side device determines, according to the capability information reported by the terminal, that the terminal supports switching to the second SIM for communication operation when the first SIM remains in the connected state, a context of the first SIM for communication operation can still be retained when it is determined that the terminal uses the second SIM for communication operation, so as to quickly resume communication with the first SIM. It should be understood that the context of the first SIM for communication operation can also be deleted to reduce an occupation of a storage space of the network side device.

In an embodiment, the first SIM leaving the connected state includes the first SIM leaving the connected state based on an access stratum; and/or the first SIM leaving the connected state based on the non-access stratum.

The first SIM leaving the connected state can be according to an instruction of access stratum signaling (such as leaving the connected state according to signaling sent by the base station), or it can be leaving the connected state according to signaling sent by the non-access stratum (such as leaving the connected state according to signaling sent by the core network).

In an embodiment, the first SIM remaining in the connected state includes the first SIM remaining in the connected state based on an access stratum; and/or the first SIM remaining in the connected state based on the non-access stratum.

The first SIM remaining in the connected state can be according to an instruction of access stratum signaling (such as remaining in the connected state according to signaling sent by the base station), or it can be remaining in the connected state according to signaling sent by the non-access stratum (such as remaining in the connected state according to signaling sent by a core network).

FIG. 4 is a schematic flowchart of another capability determination method illustrated according to an embodiment of the present disclosure. As shown in FIG. 4, the method further includes the following steps.

At step 401, configuration signaling is sent to the terminal, where the configuration signaling is used for indicating a configuration for the terminal to report information about the multi-SIM connection switching to the network side device.

In an embodiment, after the terminal reports the capability information to the network side device, the terminal can further report the information about multi-SIM connection switching to the network side device when performing the multi-SIM connection switching. In this case, the network side device can send the configuration signaling to the terminal after receiving the capability information, such as radio resource control (RRC) reconfiguration signaling, and the configuration signaling carries a corresponding configuration, which can include time domain resources and/or frequency domain resources. The terminal can report the information about multi-SIM connection switching based on the configuration.

In an embodiment, a configuration indication may be carried in the configuration signaling to indicate sub-signaling used for carrying the configuration in the configuration signaling. Taking RRC reconfiguration signaling as an example of the configuration signaling, the configuration can be carried in an OtherConfig signaling of RRC reconfiguration signaling, and the terminal can be informed through the configuration indication to acquire the configuration in the OtherConfig signaling of RRC reconfiguration signaling.

In an embodiment, the terminal reports the information about the multi-SIM connection switching, which may be reported when the terminal is about to perform the multi-SIM connection switching or during the process of performing the multi-SIM connection switching.

In an embodiment, the configuration includes at least one of: whether to allow the terminal to report the information about the multi-SIM connection switching; whether to allow the terminal to report information about multi-SIM connection switching satisfying a second condition; a duration of a blocking timer for the terminal to report the information about the multi-SIM connection switching, for example, a duration of the blocking timer for the terminal to report the information about the multi-SIM connection switching when the multi-SIM connection switching satisfies the second condition, e.g., the configuration may include a length of the blocking timer for the terminal to report a connection switching message leaving the RRC connected state and/or a length of the blocking timer for the terminal to report a connection switching message remaining in the RRC connected state; a third condition for the terminal to use the blocking timer, for example, the configuration may include a condition of the blocking timer for the terminal to report a connection switching message leaving the RRC connected state, and/or a condition of the blocking timer for the terminal to report a connection switching message remaining in the RRC connected state; or a support capability of the network side device for the terminal to perform the multi-SIM connection switching.

In an embodiment, the network side device can make various configurations as needed for the terminal to report information about multi-SIM connection switching, and the configuration can instruct the terminal how to report the information about multi-SIM connection switching.

In an embodiment, the method further includes: reporting, according to the configuration, the information about the multi-SIM connection switching to the network side device when performing the multi-SIM connection switching. When the terminal performs multi-SIM connection switching, it can report the information about the multi-SIM connection switching to the network side device according to the configuration of the network side device.

For example, the network side device can configure whether to allow the terminal to report the information about the multi-SIM connection switching. When the terminal determines that it is allowed to report the information about the multi-SIM connection switching according to the configuration, the terminal can report the information about the multi-SIM connection switching. In this case, the configuration can further indicate time domain resources and frequency domain resources for the terminal to report. The terminal does not report the information about the multi-SIM connection switching when the terminal determines that it is not allowed to report the information about the multi-SIM connection switching according to the configuration.

For example, the network side device can configure whether to allow the terminal to report information about multi-SIM connection switching that satisfies a second condition, e.g., the network side device can further limit the information about multi-SIM connection switching satisfying the second condition when the network side device configures allowing the terminal to report information about the multi-SIM connection switching. For example, the network side device can carry the second condition and an indicator bit in the configuration, where the indicator bit is 1, indicating that the information about multi-SIM connection switching satisfying the second condition is allowed to be reported, and the indicator bit is 0, indicating that the information about multi-SIM connection switching satisfying the second condition is not allowed to be reported.

When the terminal determines that it is allowed to report the information about multi-SIM connection switching that satisfies the second condition according to the configuration, the terminal can report the information about multi-SIM connection switching to the network side device when performing the multi-SIM connection switching satisfying the second condition. When the terminal determines that it is not allowed to report the information about multi-SIM connection switching that satisfies the second condition according to the configuration, the terminal does not report the information about multi-SIM connection switching to the network side device when performing the multi-SIM connection switching satisfying the second condition, but the terminal can report the information about multi-SIM connection switching to the network side device when performing multi-SIM connection switching satisfying other conditions.

For example, the network side device can configure a duration of a blocking timer for the terminal to report the information about the multi-SIM connection switching, further configure a duration of the blocking timer for the terminal to report the information about the multi-SIM connection switching when the multi-SIM connection switching satisfies the second condition, and may set respective durations of the blocking timers for multi-SIM connection switching that satisfies different conditions, so as to block the reporting. After the terminal determines the duration(s) of the blocking timer(s) according to the configuration, the terminal can start a blocking timer when reporting the information about the multi-SIM connection switching to the network side device, and will not report the information about the multi-SIM connection switching again within a duration of the blocking timer, that is, under the condition that the timer has not timed out.

On this basis, the network side device can further configure a third condition for the terminal to use the blocking timer, and the terminal will use the blocking timer only when it is determined that the third condition is met, and will not use the blocking timer if the third condition is not met. For example, the third condition includes a first target type of communication operation performed by the first SIM and a second target type of communication operation performed by the second SIM, etc. Then, when the terminal performs multi-SIM connection switching, if a type of communication operation performed by the first SIM is the first target type and/or a type of communication operation performed by the second SIM is the second target type, the blocking timer can be used; otherwise, the blocking timer is not used.

It should be noted that the second condition and the third condition can be set as required, which can be the same as the first condition or different from the first condition. For example, the second condition includes at least one of the following: the first SIM leaves a connected state, or the first SIM remains in the connected state. For example, the third condition includes at least one of the following: the terminal is performing or will perform multi-SIM connection switching.

In addition, due to the different performance of network side devices, different network side devices may have different support capabilities for the terminal to perform the multi-SIM connection switching. For example, some network-side devices support the terminal to perform the multi-SIM connection switching when the first SIM leaves the connected state, and some network-side devices support the terminal to perform the multi-SIM connection switching when the first SIM remains in the connected state. Therefore, the network side device may carry a support capability in the configuration and send it to the terminal, so that the terminal can decide whether or not to report the multi-SIM connection switching information according to the configuration.

For example, if it is determined that the network side device only supports the terminal to perform the multi-SIM connection switching when the first SIM remains in the connected state, the terminal does not need to report the information about multi-SIM connection switching when the first SIM leaves the connected state, so as to avoid wasting communication resources (because even if the information about multi-SIM connection switching is reported in such a case, the network side device cannot make a reasonable configuration for a process of the terminal performing multi-SIM connection switching), and the terminal can report the information about multi-SIM connection switching when the first SIM remains in the connected state for multi-SIM connection switching.

In an embodiment, the information about the multi-SIM connection switching reported by the terminal includes at least one of the following: information about switching to the second SIM to be switched during a process of the terminal performing multi-SIM connection switching, such as an identification of the second SIM; or information about the communication operation performed after switching to the second SIM, such as a type of the communication operation performed after switching to the second SIM, a duration of the communication operation, etc.

In an embodiment, after receiving the information about multi-SIM connection switching, the network side device can make appropriate configurations for the process of multi-SIM connection switching performed by the terminal. For example, the information about multi-SIM connection switching includes a second type of communication operation to be performed when switching to the second SIM. Since a first type of communication operation being performed by the first SIM is known to the network side device, the network side device, after determining the second type, can make an appropriate configuration for the process of the terminal performing the multi-SIM connection switching based on the first type and the second type.

For example, if a priority of the first type is higher than a priority of the second type, the network side device can configure the terminal not to switch to the second SIM for communication, and if the priority of the second type is higher than the first type, the network side device can configure the terminal to switch to the second SIM for communication.

The first type and the second type can refer to service types, and the priorities corresponding to the service types can be related to delays allowed by the service types, e.g., the lower the delay allowed, the higher the priority.

In addition to the way of configuring the process of the terminal performing the multi-SIM connection switching mentioned above, other ways can also be considered. For example, delays allowed by the first type and the second type can be considered. For example, if a delay allowed by the first type is relatively large, such as greater than a delay threshold, the network side device can be configured to allow the terminal to switch to the second SIM for communication. For example, if the delay allowed by the first type is relatively small, such as less than the delay threshold, the network side device can be configured not to allow the terminal to switch to the second SIM.

Corresponding to the foregoing embodiments of the capability indication methods and the capability determination methods, the present disclosure further provides embodiments of capability indication apparatuses and capability determination apparatuses.

An embodiment of the present disclosure further provides a capability indication apparatus. The capability indication apparatus shown in this embodiment can be performed by a terminal, including but not limited to a communication apparatus such as a cell phone, a tablet computer, a wearable device, a sensor, an IoT device, and the like. The terminal can be used as user equipment to communicate with a network side device, including but is not limited to a network side device in a communication system such as 4G, 5G, 6G, etc., and the network side device may be a base station, a core network, and the like.

In an embodiment, the terminal may be provided with a plurality of SIMs, either a conventional SIM or an eSIM, i.e., an embedded SIM.

Hereinafter, the technical solution of the present disclosure will be exemplified mainly in the case that the plurality of SIMs includes a first SIM and a second SIM. The first SIM and the second SIM do not specifically refer to a certain SIM, but are used to represent any two different SIMs among a plurality of SIMs. The first SIM and the second SIM can belong to a same operator or different operators, and can be selected as required.

In an embodiment, the capability indication apparatus includes one or more processors, and the one or more processors are configured to perform: sending capability information to a network side device, where the capability information is used for indicating a capability of the terminal to perform multi-SIM connection switching.

In an embodiment, the terminal is provided with a plurality of subscriber identity modules (SIMs), and the plurality of SIMs at least includes a first SIM and a second SIM, and the multi-SIM connection switching includes switching to the second SIM for communication operation when communication operation is performed through the first SIM.

In an embodiment, the capability of the terminal to perform multi-SIM connection switching includes whether the terminal is capable of performing the multi-SIM connection switching in case that a first condition is satisfied, where the first condition includes at least one of: the first SIM leaves a connected state; or the first SIM remains in the connected state.

In an embodiment, the first SIM leaving the connected state includes the first SIM leaving the connected state based on an access stratum; and/or the first SIM leaving the connected state based on the non-access stratum.

In an embodiment, the first SIM remaining in the connected state includes the first SIM remaining in the connected state based on an access stratum; and/or the first SIM remaining in the connected state based on the non-access stratum.

In an embodiment, the network side device only includes a new radio (NR) network side device, and the capability information is carried in UE-NR-Capability signaling; and/or the network side device includes an evolved UMTS terrestrial radio access network (E-UTRAN) network side device, and the capability information is carried in UE-EUTRA-Capability signaling.

In an embodiment, the network side device includes the E-UTRAN network side device, and when the first SIM and/or the second SIM of the multi-SIM connection switching performs a communication operation based on NR, the capability information is carried in a newly added information element of the UE-EUTRA-Capability signaling.

In an embodiment, the one or more processors are further configured to perform: receiving configuration signaling sent by the network side; and determining a configuration for reporting information about the multi-SIM connection switching to the network side device according to the configuration signaling.

In an embodiment, the configuration includes at least one of: whether to allow the terminal to report the information about the multi-SIM connection switching; whether to allow the terminal to report information about multi-SIM connection switching satisfying a second condition; a duration of a blocking timer for the terminal to report the information about the multi-SIM connection switching; a third condition for the terminal to use the blocking timer; or a support capability of the network side device for the terminal to perform the multi-SIM connection switching.

In an embodiment, the one or more processors are further configured to perform: reporting, according to the configuration, the information about the multi-SIM connection switching to the network side device when performing the multi-SIM connection switching.

An embodiment of the present disclosure further provides a capability determination apparatus. The capability determination apparatus shown in this embodiment can be performed by a network side device, such as a base station and a core network, the network side device may be in communication with a terminal, the terminal including but not limited to a communication apparatus such as a cell phone, a tablet computer, a wearable device, a sensor, an IoT device, etc., and the network side device includes but is not limited to a network side device in a communication system such as 4G, 5G, 6G, etc.

In an embodiment, the terminal may be provided with a plurality of SIMs, either a conventional SIM or an eSIM, i.e., an embedded SIM.

Hereinafter, the technical solution of the present disclosure will be exemplified mainly in the case that the plurality of SIMs includes a first SIM and a second SIM. The first SIM and the second SIM do not specifically refer to a certain SIM, but are used to represent any two different SIMs among a plurality of SIMs. The first SIM and the second SIM can belong to the same operator or different operators, and can be selected as required.

In an embodiment, the capability determination apparatus includes one or more processors, and the one or more processors are configured to perform: receiving capability information sent by a terminal; and determining a capability of the terminal to perform multi-SIM connection switching according to the capability information.

In an embodiment, the terminal is provided with a plurality of subscriber identity modules (SIMs), and the plurality of SIMs at least includes a first SIM and a second SIM, and the multi-SIM connection switching includes switching to the second SIM for communication operation when communication operation is performed through the first SIM.

In an embodiment, the one or more processors are further configured to perform: determining, according to the capability information, whether the terminal is capable of performing the multi-SIM connection switching in case that a first condition is satisfied, where the first condition includes at least one of: the first SIM leaves a connected state; or the first SIM remains in the connected state.

In an embodiment, the first SIM leaving the connected state includes the first SIM leaving the connected state based on an access stratum; and/or the first SIM leaving the connected state based on the non-access stratum.

In an embodiment, the first SIM remaining in the connected state includes the first SIM remaining in the connected state based on an access stratum; and/or the first SIM remaining in the connected state based on the non-access stratum.

In an embodiment, the one or more processors are further configured to perform: sending configuration signaling to the terminal, where the configuration signaling is used for indicating a configuration for the terminal to report information about the multi-SIM connection switching to the network side device.

In an embodiment, the configuration includes at least one of: whether to allow the terminal to report the information about the multi-SIM connection switching; whether to allow the terminal to report information about multi-SIM connection switching satisfying a second condition; a duration of a blocking timer for the terminal to report the information about the multi-SIM connection switching; a third condition for the terminal to use the blocking timer; or a support capability of the network side device for the terminal to perform the multi-SIM connection switching.

Regarding to the apparatus in the above embodiment, a specific way in which each module performs operations has been described in detail in the embodiment of related methods, and will not be described in detail here.

For the apparatus embodiment, because it basically corresponds to the method embodiment, it is only necessary to refer to the method embodiment for the relevant part of the description. The apparatus embodiments described above are only schematic, where the modules described as separate components may or may not be physically separated, and the components displayed as modules may or may not be physical modules; that is, they may be located in one place or distributed to a plurality of network modules. Some or all of the modules can be selected according to actual needs to achieve the purpose of this embodiment. It can be understood and implemented by a person of ordinary skill in the art without creative labor.

An embodiment of the present disclosure further provides a communication apparatus, including a processor, and a memory for storing a computer program, where the capability indication method described in any of the above embodiments is implemented when the computer program is executed by the processor.

An embodiment of the present disclosure further provides a communication apparatus, including a processor and a memory for storing a computer program, where the capability determination method described in any of the above embodiments is implemented when the computer program is executed by the processor.

An embodiment of the present disclosure further provides a computer-readable storage medium for storing a computer program, which, when executed by a processor, realizes the steps in the capability indication method described in any of the above embodiments.

An embodiment of the present disclosure further provides a computer-readable storage medium for storing a computer program, which, when executed by a processor, realizes the steps in the capability determination method described in any of the above embodiments.

As shown in FIG. 5, FIG. 5 is a schematic block diagram of an apparatus 500 for capability determination illustrated according to an embodiment of the present disclosure. The apparatus 500 may be provided as a base station. Referring to FIG. 5, the apparatus 500 includes a processing component 522, a wireless transmitting/receiving component 524, an antenna component 526, and a signal processing part unique to a wireless interface, and the processing component 522 may further include one or more processors. One of the processors in the processing component 522 may be configured to implement the capability determination method described in any of the above embodiments.

FIG. 6 is a schematic block diagram of an apparatus 600 for capability indication illustrated according to an embodiment of the present disclosure. For example, the apparatus 600 may be a mobile phone, a computer, a digital broadcasting terminal, a messaging device, a game console, a tablet device, a medical device, a fitness device, a personal digital assistant, etc.

Referring to FIG. 6, the apparatus 600 may include one or more of the following components: a processing component 602, a memory 604, a power component 606, a multimedia component 608, an audio component 610, an input/output (I/O) interface 612, a sensor component 614, and a communication component 616.

The processing component 602 generally controls the overall operation of the apparatus 600, such as operations associated with display, telephone call, data communication, camera operation, and recording operation. The processing component 602 may include one or more processors 620 to execute instructions to complete all or part of the steps of the capability indication method. In addition, the processing component 602 may include one or more modules to facilitate interactions between the processing component 602 and other components. For example, the processing component 602 may include a multimedia module to facilitate interactions between the multimedia component 608 and the processing component 602.

The memory 604 is configured to store various types of data to support operations in the apparatus 600. Examples of these data include instructions of any application program or method for being operated on the apparatus 600, contact data, phone book data, messages, pictures, videos, etc. The memory 604 can be implemented by any type of volatile or non-volatile memory device or combinations thereof, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk, or optical disk.

The power component 606 provides power to various components of the apparatus 600. The power component 606 may include a power management system, one or more power supplies, and other components associated with generating, managing, and distributing power for the apparatus 600.

The multimedia component 608 includes a screen that provides an output interface between the apparatus 600 and a user. In some embodiments, the screen may include a liquid crystal display (LCD) and a touch panel (TP). If the screen includes a touch panel, the screen may be implemented as a touch screen to receive an input signal from a user. The touch panel includes one or more touch sensors to sense touching, sliding, and gestures on the touch panel. The touch sensor may not only sense a boundary of a touching or sliding action, but also detect a duration and a pressure related to the touching or sliding operation. In some embodiments, the multimedia component 608 includes a front camera and/or a rear camera. When the apparatus 600 is in an operation mode, such as a shooting mode or a video mode, the front camera and/or the rear camera can receive external multimedia data. Each front camera and rear camera may be a fixed optical lens system or have a focal length and optical zoom capability.

The audio component 610 is configured to output and/or input audio signals. For example, the audio component 610 includes a microphone (MIC) configured to receive external audio signals when the apparatus 600 is in the operation mode, such as a calling mode, a recording mode, and a voice recognition mode. The received audio signal may be further stored in the memory 604 or transmitted via the communication component 616. In some embodiments, the audio component 610 further includes a speaker for outputting audio signals.

The I/O interface 612 provides an interface between the processing component 602 and peripheral interface modules, where the peripheral interface modules may be keyboards, click-wheels, buttons, etc. These buttons may include, but are not limited to: home button, volume button, start button, and lock button.

The sensor component 614 includes one or more sensors for providing various aspects of state evaluation for the apparatus 600. For example, the sensor component 614 can detect an on/off state of the apparatus 600, a relative positioning of components, for example, the components are the display and the keypad of the apparatus 600, and the sensor component 614 can also detect a position change of the apparatus 600 or a component of the apparatus 600, presence or absence of user contact with the apparatus 600, orientation or acceleration/deceleration of the apparatus 600 and a temperature change of the apparatus 600. The sensor component 614 may include a proximity sensor configured to detect the presence of a nearby object without any physical contact. The sensor component 614 may also include an optical sensor, such as a CMOS or CCD image sensor, for use in imaging applications. In some embodiments, the sensor component 614 may further include an acceleration sensor, a gyroscope sensor, a magnetic sensor, a pressure sensor, or a temperature sensor.

The communication component 616 is configured to facilitate wired or wireless communication between the apparatus 600 and other devices. The apparatus 600 can access a wireless network based on communication standards, such as WiFi, 2G or 3G, 4G LTE, 5G NR, or combinations thereof. In an embodiment, the communication component 616 receives a broadcast signal or broadcast-related information from an external broadcast management system via a broadcast channel. In an embodiment, the communication component 616 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology, and other technologies.

In an embodiment, the apparatus 600 may be implemented by one or more application-specific integrated circuits (ASIC), digital signal processors (DSP), digital signal processing devices (DSPD), programmable logic devices (PLD), field programmable gate arrays (FPGA), controllers, micro-controllers, micro-processors, or other electronic components, for executing the capability indication method.

In an embodiment, a non-transitory computer-readable storage medium is further provided, such as the memory 604 including instructions, where the instructions can be executed by a processor 620 of the apparatus 600 to complete the capability indication method. For example, the non-transitory computer-readable storage medium may be a ROM, a random access memory (RAM), a CD-ROM, a magnetic tape, a floppy disk, an optical data storage device, etc.

Other embodiments of the present disclosure will easily occur to those skilled in the art after considering the specification and practicing the disclosure disclosed herein. The present disclosure is intended to cover any variations, uses, or adaptations of the present disclosure, and these variations, uses, or adaptations follow general principles of the present disclosure and include common sense or common technical means in the technical field that are not disclosed in the present disclosure. The specification and embodiments are to be regarded as exemplary only, and the true scope and spirit of the present disclosure are indicated by the following claims.

It should be understood that the present disclosure is not limited to precise structures described above and shown in the accompanying drawings, and various modifications and changes can be made without departing from its scope. The scope of the present disclosure is limited only by the appended claims.

It should be noted that relational terms here, such as first and second, are only used to distinguish one entity or operation from another entity or operation, and do not necessarily require or imply that there is any such actual relationship or order between these entities or operations. Terms "including", "containing" or any other variations thereof are intended to cover non-exclusive inclusion, so that a process, method, object or device including a series of elements not only includes those elements, but also includes other elements not explicitly listed or elements inherent to such process, method, object or device. Without further limitations, an element defined by the phrase "including one" does not exclude the existence of other identical elements in the process, method, object, or device, including the element.

The methods and apparatuses of the present disclosure are described in detail herein. The principles and implementations of the present disclosure are described herein through specific examples. The description of the embodiments of the present disclosure is merely provided for ease of understanding of the method and core ideas of the present disclosure. Persons of ordinary skill in the art can make variations and modifications to the present disclosure in terms of the specific implementations and application scopes according to the ideas of the present disclosure. Therefore, the specification shall not be construed as a limit to the present disclosure.

The invention claimed is:

1. A capability indication method, performed by a terminal, comprising:

sending capability information to a network side device, wherein the capability information indicates a capability of the terminal to perform multiple subscriber identity module (multi-SIM) connection switching;

receiving configuration signaling sent by the network side device;

determining, according to the configuration signaling, a configuration for reporting information about the multi-SIM connection switching to the network side device; and reporting, according to the configuration, the information about the multi-SIM connection switching to the network side device when performing the multi-SIM connection switching, wherein the information about the multi-SIM connection switching comprises a second type of a communication operation to be performed when switching to a second SIM, so that the network side device makes, based on the second type and a first type of a communication operation being performed by a first SIM, a configuration for a process of the terminal performing the multi-SIM connection switching.

2. The method according to claim 1, wherein the terminal is provided with a plurality of SIMs, and the plurality of SIMs at least comprise the first SIM and the second SIM, and the multi-SIM connection switching comprises switching to the second SIM for a communication operation when a communication operation is performed through the first SIM.

3. The method according to claim 2, wherein the capability of the terminal to perform the multi-SIM connection switching comprises whether the terminal is capable of performing the multi-SIM connection switching in case that a first condition is satisfied, wherein the first condition comprises at least one of:

the first SIM leaves a connected state; or the first SIM remains in the connected state.

4. The method according to claim 3, wherein the first SIM leaves the connected state comprises at least one of:

the first SIM leaves the connected state based on an access stratum; or the first SIM leaves the connected state based on a non-access stratum.

5. The method according to claim 3, wherein the first SIM remains in the connected state comprises at least one of:

the first SIM remains in the connected state based on an access stratum; or the first SIM remains in the connected state based on a non-access stratum.

6. The method according to claim 1, wherein the network side device comprises at least one of a new radio (NR) network side device or an evolved UMTS terrestrial radio access network (E-UTRAN) network side device;

when the network side device only comprises the NR network side device, the capability information is carried in UE-NR-Capability signaling; or when the network side device comprises the E-UTRAN network side device, the capability information is carried in UE-EUTRA-Capability signaling.

7. The method according to claim 6, wherein the network side device comprises the E-UTRAN network side device, and when at least one of the first SIM or the second SIM of the multi-SIM connection switching performs a communication operation based on NR, the capability information is carried in a newly added information element of the UE-EUTRA-Capability signaling.

8. The method according to claim 1, wherein the configuration comprises at least one of:

whether to allow the terminal to report the information about the multi-SIM connection switching;

whether to allow the terminal to report information about multi-SIM connection switching satisfying a second condition;

a duration of a blocking timer for the terminal to report the information about the multi-SIM connection switching;

a third condition for the terminal to use the blocking timer; or a support capability of the network side device for the terminal to perform the multi-SIM connection switching.

9. A capability determination method, performed by a network side device, comprising:

receiving capability information sent by a terminal;

determining, according to the capability information, a capability of the terminal to perform multiple subscriber identity module (multi-SIM) connection switching;

sending configuration signaling to the terminal, wherein the configuration signaling indicates a configuration for the terminal to report information about the multi-SIM connection switching to the network side device;

receiving the information about the multi-SIM connection switching reported by the terminal according to the configuration when performing the multi-SIM connection switching, wherein the information about the multi-SIM connection switching comprises a second type of a communication operation to be performed when switching to a second SIM; and making, based on the second type and a first type of a communication operation being performed by a first SIM, a configuration for a process of the terminal performing the multi-SIM connection switching.

10. The method according to claim 9, wherein the terminal is provided with a plurality of SIMs, and the plurality of SIMs at least comprise the first SIM and the second SIM, and the multi-SIM connection switching comprises switching to the second SIM for a communication operation when a communication operation is performed through the first SIM.

11. The method according to claim 10, wherein determining, according to the capability information, the capability of the terminal to perform the multi-SIM connection switching comprises:

determining, according to the capability information, whether the terminal is capable of performing the multi-SIM connection switching in case that a first condition is satisfied, wherein the first condition comprises at least one of:

the first SIM leaves a connected state; or the first SIM remains in the connected state.

12. The method according to claim 11, wherein the first SIM leaves the connected state comprises at least one of:

the first SIM leaves the connected state based on an access stratum; or the first SIM leaves the connected state based on a non-access stratum.

13. The method according to claim 11, wherein the first SIM remains in the connected state comprises at least one of:

the first SIM remains in the connected state based on an access stratum; or the first SIM remains in the connected state based on a non-access stratum.

14. The method according to claim 9, wherein the configuration comprises at least one of:

whether to allow the terminal to report the information about the multi-SIM connection switching;

whether to allow the terminal to report information about multi-SIM connection switching satisfying a second condition;

a duration of a blocking timer for the terminal to report the information about the multi-SIM connection switching;

a third condition for the terminal to use the blocking timer; or a support capability of the network side device for the terminal to perform the multi-SIM connection switching.

15. A communication apparatus, comprising:

a processor; and a memory for storing a computer program;

wherein the computer program, when executed by the processor, implements operations comprising:

sending capability information to a network side device, wherein the capability information indicates a capability of a terminal to perform multiple subscriber identity module (multi-SIM) connection switching;

receiving configuration signaling sent by the network side device;

determining, according to the configuration signaling, a configuration for reporting information about the multi-SIM connection switching to the network side device; and reporting, according to the configuration, the information about the multi-SIM connection switching to the network side device when performing the multi-SIM connection switching, wherein the information about the multi-SIM connection switching comprises a second type of a communication operation to be performed when switching to a second SIM, so that the network side device makes, based on the second type and a first type of a communication operation being performed by a first SIM, a configuration for a process of the terminal performing the multi-SIM connection switching.

16. A communication apparatus, comprising:

a processor; and a memory for storing a computer program;

wherein the computer program, when executed by the processor, implements the capability determination method according to claim 11.

17. A non-transitory computer-readable storage medium, wherein the non-transitory computer-readable storage medium stores a computer program, and the computer program, when executed by a processor, implements the steps in the capability indication method according to claim 1.

18. A non-transitory computer-readable storage medium, wherein the non-transitory computer-readable storage medium stores a computer program, and the computer program, when executed by a processor, implements the steps in the capability determination method according to claim 9.

* * * * *